United States Patent
Ali et al.

(10) Patent No.: US 12,491,747 B2
(45) Date of Patent: Dec. 9, 2025

(54) METHODS FOR CREATING CLEARANCE BENEATH VEHICLE WHEELS

(71) Applicant: JAGUAR LAND ROVER LIMITED, Coventry (GB)

(72) Inventors: Syed Asad Ali, Coventry (GB); Luke Birch, Mickleton (GB); Sam Brown, Kingsbridge (GB); Dennis Lausecker, Coventry (GB); Anesh Mistry, Coventry (GB); William Burdock, Sutton Coldfield (GB); James Kelly, Solihull (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 209 days.

(21) Appl. No.: 18/039,240

(22) PCT Filed: Nov. 26, 2021

(86) PCT No.: PCT/EP2021/083088
§ 371 (c)(1),
(2) Date: May 27, 2023

(87) PCT Pub. No.: WO2022/112465
PCT Pub. Date: Jun. 2, 2022

(65) Prior Publication Data
US 2024/0059119 A1   Feb. 22, 2024

(30) Foreign Application Priority Data
Nov. 27, 2020   (GB) ..................................... 2018691

(51) Int. Cl.
*B60G 17/0195*   (2006.01)
*B60G 17/02*   (2006.01)

(52) U.S. Cl.
CPC ......... *B60G 17/0195* (2013.01); *B60G 17/02* (2013.01); *B60G 2500/32* (2013.01)

(58) Field of Classification Search
CPC . B60G 17/0195; B60G 17/02; B60G 2500/32
(Continued)

(56) References Cited

U.S. PATENT DOCUMENTS

| 5,033,573 A | * | 7/1991 | Hrovat | ............... B60G 17/0195 |
| | | | | 701/84 |
| 5,517,414 A | * | 5/1996 | Hrovat | ................. B60G 17/019 |
| | | | | 701/91 |

(Continued)

FOREIGN PATENT DOCUMENTS

| DE | 1943754 U | 8/1966 |
| DE | 102014008620 A1 | 12/2015 |

(Continued)

OTHER PUBLICATIONS

International Search Report and Written Opinion for Application No. PCT/EP2021/083088, dated Mar. 21, 2022, 19 pages.
(Continued)

*Primary Examiner* — Logan M Kraft
(74) *Attorney, Agent, or Firm* — TROUTMAN PEPPER LOCKE LLP; Dustin B. Weeks; Nicholas H. Doss

(57) ABSTRACT

A control system (300) for controlling an active suspension system (104) of a vehicle (100), the control system comprising one or more controller (301), wherein the control system is configured to: determine (804) that an entry condition is satisfied; in dependence on satisfaction of the entry condition, transmit (806) a request to the active suspension system to create clearance beneath a first wheel (FL, RR) of the vehicle but not create clearance beneath a plurality of other wheels (FR, RL) of the vehicle.

18 Claims, 4 Drawing Sheets

(58) Field of Classification Search
USPC .......................................................... 701/37
See application file for complete search history.

(56) References Cited

U.S. PATENT DOCUMENTS 5,797,607 A * 8/1998 Kopczynski ............. B60G 9/02
280/6.154
2018/0126992 A1 5/2018 Lu et al.

FOREIGN PATENT DOCUMENTS

| | | | | | |
|---|---|---|---|---|---|
| GB | 2358004 | A | * | 7/2001 | ......... B60G 17/0162 |
| GB | 2505668 | A | | 3/2014 | |
| JP | 2004358988 | A | | 12/2004 | |
| JP | 2007038918 | A | | 2/2007 | |
| WO | 8900928 | A1 | | 2/1989 | |
| WO | 2014037541 | A1 | | 3/2014 | |

OTHER PUBLICATIONS

Combined Search and Examination Report for Application No. GB2018691.2, dated Aug. 9, 2021, 6 pages.

* cited by examiner

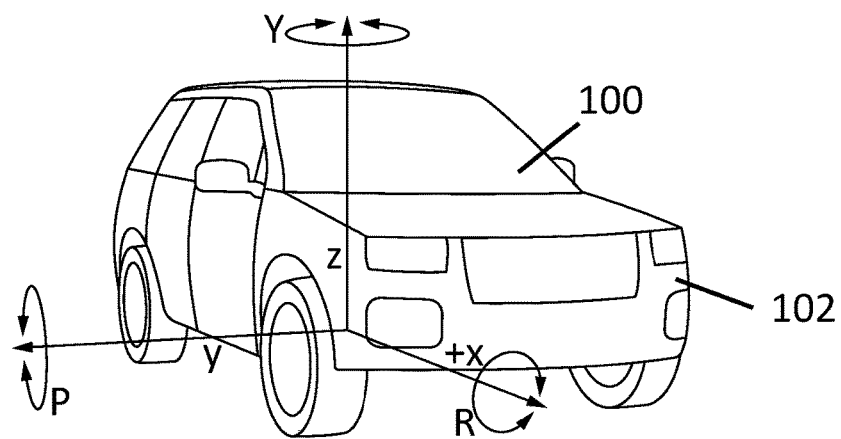
FIG. 1
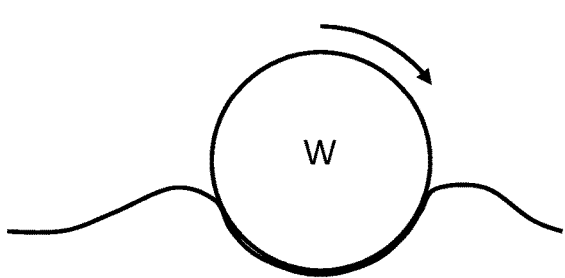
FIG. 2A
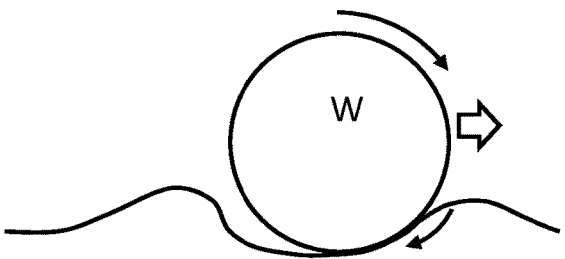
FIG. 2B
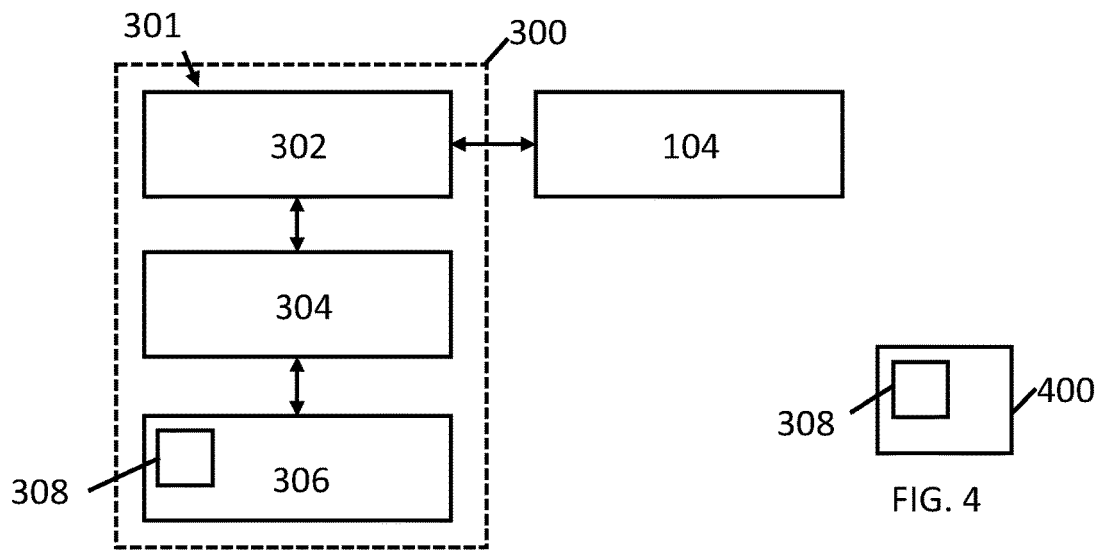
FIG. 3
FIG. 4

METHODS FOR CREATING CLEARANCE BENEATH VEHICLE WHEELS

TECHNICAL FIELD

The present disclosure relates to methods for creating clearance beneath vehicle wheels. In particular, but not exclusively it relates to methods for controlling an active suspension system of a vehicle to create clearance beneath at least a first wheel of the vehicle, to aid recovery of a vehicle stuck in terrain.

BACKGROUND

When driving a vehicle on surfaces that comprise independently-movable particles such as sand or gravel (or in some cases snow) a vehicle may become stuck. As an example this can occur due to excessive wheel spin of slipping wheels, which displaces the particles underneath the wheel causing the vehicle to 'sink' into the surface.

The buildup of particles around the wheels results in resistance to progress, which if greater than the usable tractive force will stop progress of the vehicle. This scenario can become worse if the vehicle becomes 'bellied out'. This is because the contact patch force on the wheels is reduced and because additional resistance is encountered due to the friction of the vehicle undercarriage in direct contact with the surface over which the vehicle is travelling.

Recovering the vehicle without a recovery board, shovel or winch requires advanced driving techniques. A driver may deflate their tyres and slowly spin the wheels while sawing the steering wheel left to right to attempt to climb out of the surface.

SUMMARY OF THE INVENTION

It is an aim of the present invention to address one or more of the disadvantages associated with the prior art.

According to an aspect of the invention there is provided a control system for controlling an active suspension system of a vehicle, the control system comprising one or more controller, wherein the control system is configured to:

determine that an entry condition is satisfied; in dependence on satisfaction of the entry condition, transmit a request to the active suspension system to create clearance beneath a first wheel of the vehicle but not create clearance beneath a plurality of other wheels of the vehicle. An advantage is that a reasonable body-to-surface clearance is maintained to prevent bellying out. That is, the ride height of the vehicle does not reduce or oscillate significantly In some examples, the request is configured to control a suspension actuator of the first wheel to lift the first wheel. Optionally the request is further configured to control suspension actuators of the plurality of other wheels to increase a vertical distance by which the first wheel can be lifted above the surface.

In some examples, the first wheel is at a first lateral side of the vehicle and at a first longitudinal end of the vehicle, and wherein the plurality of other wheels comprise at least: a second wheel at a second lateral side of the vehicle and at the first longitudinal end; and a third wheel at the first lateral side and at a second longitudinal end of the vehicle.

In some examples, the request is configured to create clearance beneath wheels of a diagonal pair of wheels comprising the first wheel and a fourth wheel of the vehicle, wherein the fourth wheel is at the second lateral side and at the second longitudinal end, diagonally opposite the first wheel.

In some examples, the request is configured to create clearance beneath the first wheel but not beneath the second wheel, the third wheel, and a fourth wheel of the vehicle, wherein the fourth wheel is at the second lateral side and at the second longitudinal end, diagonally opposite the first wheel.

In some examples, the control system is configured to transmit a second request to the active suspension system to create clearance beneath the second wheel but not create clearance beneath at least the first wheel and the fourth wheel.

In some examples, the second request is configured to create clearance beneath wheels of a diagonal pair of wheels comprising the second wheel and the third wheel.

In some examples, the second request is configured to create clearance beneath the second wheel but not create clearance beneath the first wheel, the third wheel and the fourth wheel, and wherein the control system is configured to: transmit a third request to the active suspension system to create clearance beneath the third wheel but not create clearance beneath the first, second and fourth wheels; and transmit a fourth request to the active suspension system to create clearance beneath the fourth wheel but not create clearance beneath the first, second and third wheels.

In some examples, the request comprises a force request configured to overcome restoring force associated with the first wheel, to substantially remove a contact patch beneath the first wheel.

In some examples, the control system is configured to control the active suspension system to cause a spring rate associated with the first wheel to have a reduced value when the active suspension system creates the clearance.

In some examples, wherein satisfaction of the entry condition comprises receiving a user-initiated request to create the clearance beneath the first wheel.

In some examples, the user-initiated request is configured to identify the first wheel as a user-selected wheel and/or wherein the control system is configured to control selection of the first wheel in response to the user-initiated request.

In some examples, satisfaction of the entry condition requires determining that the vehicle is not moving.

In some examples, satisfaction of the entry condition requires one or more of: determining that vehicle doors are closed; determining that one or more occupants are inside the vehicle; or determining that the vehicle is secured against movement.

In some examples, the control system is configured to maintain the request to maintain the clearance beneath the first wheel for not more than a set duration or until a second condition is satisfied.

In some examples, the second condition is: a transition condition configured to create clearance beneath a different wheel of the vehicle; or an exit condition dependent on at least a user-initiated termination request.

In some examples, satisfaction of the transition condition is dependent on a user-initiated request.

In some examples, satisfaction of the transition condition requires determining that the vehicle is not moving.

In some examples, satisfaction of the transition condition requires one or more of: determining that vehicle doors are closed; determining that one or more occupants are inside the vehicle; or determining that the vehicle is secured against movement.

In some examples, the control system is configured to transmit a request to a torque source to rotate the first wheel by a rotation of less than one full rotation, while the request for clearance beneath the first wheel is maintained.

In some examples, the control system is configured to transmit a time-varying request to the active suspension system for causing oscillation of the first wheel while the first wheel is rotated.

According to a further aspect of the invention there is provided a vehicle comprising the control system.

According to a further aspect of the invention there is provided a method of controlling an active suspension system of a vehicle, the method comprising: determining that an entry condition is satisfied; and in dependence on satisfaction of the entry condition, transmitting a request to the active suspension system to create clearance beneath a first wheel of the vehicle but not create clearance beneath a plurality of other wheels of the vehicle.

According to a further aspect of the invention there is provided computer software that, when executed, is arranged to perform the method. According to a further aspect of the invention there is provided a non-transitory computer readable medium comprising computer readable instructions that, when executed by a processor, cause performance of any one or more of the methods described herein.

The one or more controller may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example vehicle and a coordinate system;

FIGS. 2A, 2B illustrate a wheel stuck in a surface and then recovering from the surface;

FIG. 3 illustrates an example control system;

FIG. 4 illustrates an example of a non-transitory computer-readable storage medium;

DETAILED DESCRIPTION

Figure 5:
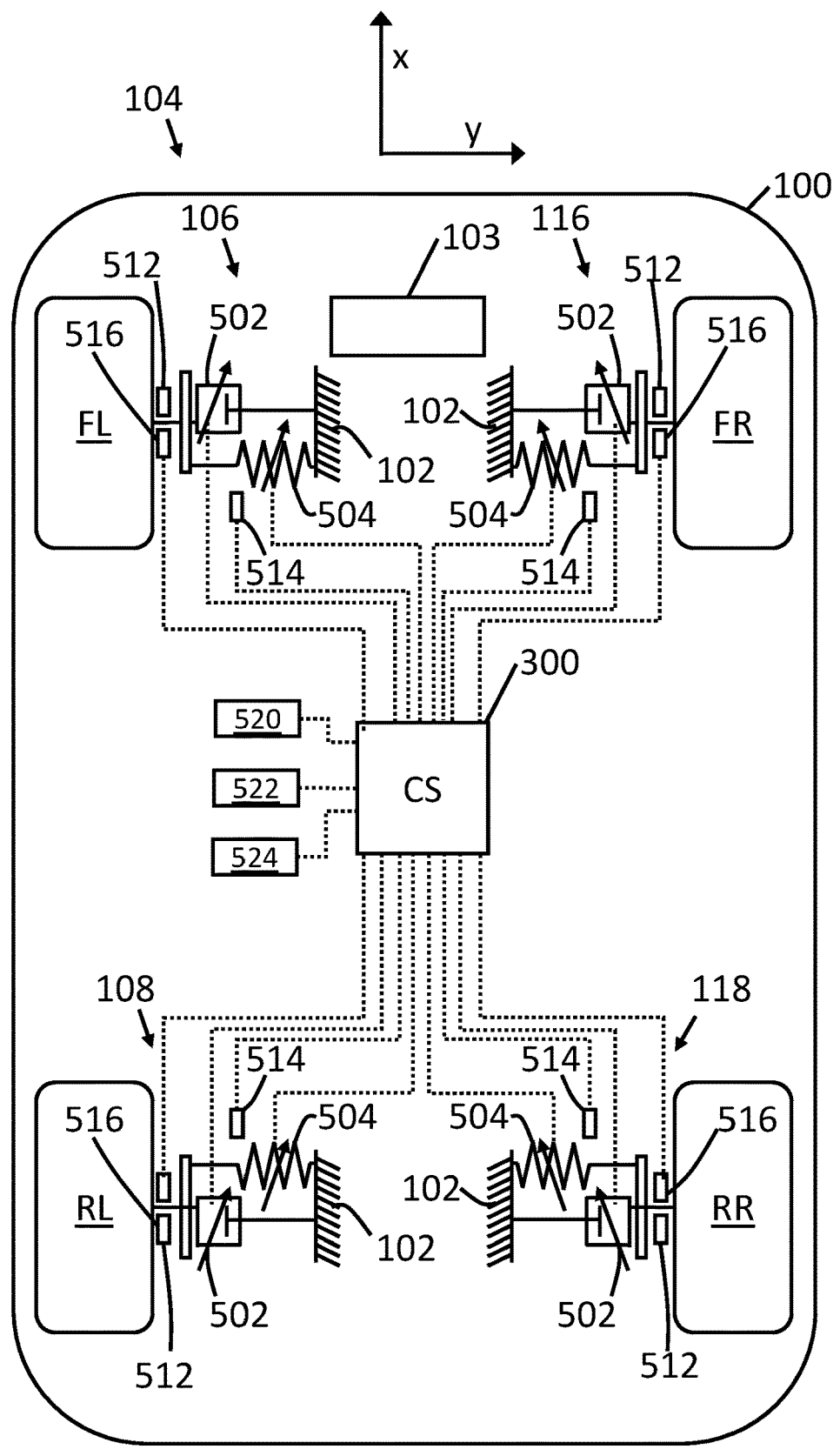
FIG. 5 illustrates an example of an active suspension system of a vehicle.

FIG. 1 illustrates an example of a vehicle 100 in which embodiments of the invention can be implemented. In some, but not necessarily all examples, the vehicle 100 is a passenger vehicle, also referred to as a passenger car or as an automobile. In other examples, embodiments of the invention can be implemented for other applications, such as industrial or commercial vehicles. The vehicle 100 has a vehicle body 102 (sprung mass) supported by a suspension.

FIG. 1 also illustrates a coordinate system. The x-axis is the longitudinal axis. A vehicle body rotation 'R' about the x-axis is roll. The y-axis is the lateral axis. A vehicle body rotation 'P' about the y-axis is pitch. The z-axis is the vertical axis. A vehicle body rotation 'Y' about the z-axis is yaw.

FIG. 2A schematically illustrates a wheel W stuck in a particulate surface. Due to excessive wheel spin, the wheel has displaced particles underneath, in front of and behind the wheel and so has sunk down below the piles of particulate material displaced by the wheel, such that the wheel has to climb up and over the pile if it is to continue progress. In the example shown in FIG. 2A, the angle of the pile ahead of the wheel is too steep to climb out, especially because the loose surface provides insufficient traction.

FIG. 2B schematically illustrates the wheel climbing out of the particulate surface because the angle of the surface is much shallower. An effective method of reducing the angle is to move some particulate matter underneath the wheel, either manually (typically by digging with a shovel or the like) or by the paddling action of the tread of the tyre of the rotating wheel.

A hindrance to moving particulate matter underneath the wheel is that there is typically no ground clearance beneath the wheel. If the wheel can be lifted at least momentarily to reduce or remove its ground contact, clearance space is created beneath the wheel into which particles can flow.

In at least some embodiments of the invention, the suspension of the vehicle 100 is an active suspension system configured to lift and push individual wheels towards and away from the vehicle body 102. For example, the active suspension system can lift a wheel away from the surface while the other wheels do not decrease vehicle ride height and prevent bellying out. This provides the opportunity for particulate matter to be kicked or otherwise displaced or moved under the wheel, enabling the wheel to climb out of the surface.

In cases where the particles do not flow under the wheels on their own (e.g. snow) or get scuffed under through wheel rotation, the user (e.g. driver) may manually move the particulate matter while wheels are lifted. Alternatively, a user could insert a recovery board under the lifted wheel. A recovery board is a long (e.g. 50-150 cm), narrow (e.g. <1 m), thin (e.g. <10 cm) and approximately planar object with a high-friction tractive surface, such as a perforated or corrugated surface.

Once the traction of one wheel has been improved, other wheels could be lifted in sequence.

The above concept is referred to herein as 'recovery mode' (e.g. granular surface recovery mode), and can be employed to help a stuck vehicle 100 to become unstuck without the need for assistance in some examples.

An active suspension system 104 and the control system 300 will first be described.

The control system 300 of FIG. 3 comprises a controller 301. In other examples, the control system 300 may comprise a plurality of controllers on-board and/or off-board the vehicle 100. In some examples, a control system 300 or a controller 301 may be supplied as part of an active suspension system 104.

The controller 301 of FIG. 3 includes at least one processor 304; and at least one memory device 306 electrically coupled to the electronic processor 304 and having instructions 308 (e.g. a computer program) stored therein, the at least one memory device 306 and the instructions 308 configured to, with the at least one processor 304, cause any one or more of the methods described herein to be performed. The processor 304 may have an interface 302 such as an electrical input/output I/O or electrical input for receiving information and interacting with external components such as the active suspension system 104.

FIG. 4 illustrates a non-transitory computer-readable storage medium 400 comprising the instructions 308 (computer software).

FIG. 5 illustrates an example implementation of the active suspension system 104.

The active suspension system 104 comprises front left active suspension 106 for a first wheel FL at a first lateral side (left) and at a first longitudinal end (front) of the vehicle 100, front right active suspension 116 for a second wheel FR at a second lateral side (right) at the first longitudinal end (front) of the vehicle 100, rear left active suspension 108 for a third wheel RL at the first lateral side (left) and at a second longitudinal end (rear) of the vehicle 100, and rear right active suspension 118 for a fourth wheel RR at the second lateral side (right) and at the second longitudinal end (rear). The active suspension for each wheel (e.g. quarter/corner) of the vehicle 100 may be individually controllable.

FIG. 5 also shows a torque source 103 such as an internal combustion engine or electric machine, for driving at least some of the vehicle wheels.

The active suspension for each corner of the vehicle 100 comprises an actuator 502.

The actuator 502 may be a hydraulic actuator such as a hydraulic fluid-filled chamber containing a piston. One end of the actuator 502 is coupled to a vehicle wheel and the other end is coupled to the vehicle body 102. A spring 504 (e.g. coil or pneumatic) may be in equilibrium and acting in parallel with the actuator 502.

When the vehicle suspension is undisturbed, the piston of the hydraulic actuator 502 sits at a particular neutral position in the chamber.

The piston can move in either direction inside the chamber, e.g. due to a road disturbance compressing the actuator 502. The piston can displace fluid out of the chamber into a hydraulic circuit (not shown). The fluid imparts a restoring force against movement of the piston. Energy can be added to and/or extracted from the actuator 502 by pumping fluid and/or controlling valves to regulate fluid pressure to either side of the piston.

Therefore, a control system 300 can dynamically control restoring force against the displaced piston. This force is equivalent to spring force of a coil spring against displacement. Dynamic control enables the force-displacement relationship to be changed to adapt to a driving scenario. Energy can be added or removed quickly, e.g. within tens of milliseconds. In order to control spring force, the control system 300 may output a force request that is dependent on sensed wheel travel (wheel-to-body displacement/articulation).

Dynamic damping characteristics of the actuator 502 can be modified by controlling a fluid valve at a constriction, which regulates the rate at which fluid is transferred in and out of the actuator 502 by movement of the piston.

Further, energy can be added to or removed from the actuator 502 in order to extend or retract the actuator 502. In FIG. 5 this enables the wheel-to-body distance to be changed independently at different ends and/or at different corners of the vehicle 100.

The above example refers to a hydraulic actuator 502, and in other embodiments the actuator may be an electromagnetic actuator or a pneumatic actuator, or the like.

In FIG. 5 but not necessarily all examples, the spring 504 comprises an active spring such as a pneumatic spring, enabling control of ride height. The control system 300 may be configured to pump gas (e.g. air) in or out of the pneumatic spring 504 to control ride height. An air-levelling function of the control system 300 seeks to maintain a set ride height irrespective of vehicle load and achieves this by modifying the volume of air and therefore air pressure to maintain the set ride height.

Energy can be added to or removed from the pneumatic spring 504 in order to increase or decrease the volume of the pneumatic spring 504. Increasing the volume can lift the vehicle body 102 in the z-axis. In FIG. 5 this enables the wheel-to-body distance to be changed independently at different ends and/or at different corners of the vehicle 100.

Additionally or alternatively, the spring 504 comprises a passive spring (e.g. coil) or is omitted entirely.

Control of the active suspension system 104 relies on one or more sensors. Wheel travel may be sensed by a wheel-to-body displacement sensor 514 (suspension displacement-based sensor), for example. The wheel-to-body displacement sensor 514 is placed somewhere on the active suspension and can sense the position of the wheel along an arc defined by suspension geometry. An example of a wheel-to-body displacement sensor 514 is a rotary potentiometer attached to a lever, wherein one end of the lever is coupled to the vehicle body 102, and the other end is coupled to a suspension link.

In some examples, the control system 300 more accurately determines the wheel travel and/or its associated derivatives by fusing information from the wheel-to-body displacement sensor 514 with information from hub accelerometers.

Pressure in the pneumatic spring 504 can be sensed to indicate weight onto the wheel.

In at least some examples the control system 300 is configured to control the active suspension system 104 by transmitting a force request to the active suspension or to a low-level controller thereof. The force request may be an arbitrated force request based on requests from various requestors and information from various sensors.

FIG. 5 illustrates additional optional features that may interact with the control system 300 to influence force request calculation. These include any one or more of:

A wheel speed sensor 512 for each wheel. In an example implementation, the wheel speed sensor 512 is part of an antilock braking system (ABS).

A hub-mounted accelerometer 516 for each wheel, coupled to the unsprung mass of the vehicle 100.

A human-machine interface (HMI) 520. This refers to any of the various input devices and input/output devices available to the driver such as touchscreens, displays, hardware switches/sliders/selectors or the like.

At least one vehicle body accelerometer 522 coupled to the vehicle body 102 (sprung mass). A particular example includes a 3DOF or 6DOF inertial measurement unit (IMU). A unit may comprise an accelerometer or a multi-axis set of accelerometers.

A tyre pressure monitoring system (TPMS) 524 comprising tyre pressure monitors for each wheel.

FIGS. 6A-7E illustrate example implementations for 'recovery mode'. In each of these examples, a reasonable body-to-surface clearance is maintained to prevent bellying out. That is, the ride height of the vehicle 100 does not reduce or oscillate significantly.

Figure 6A:
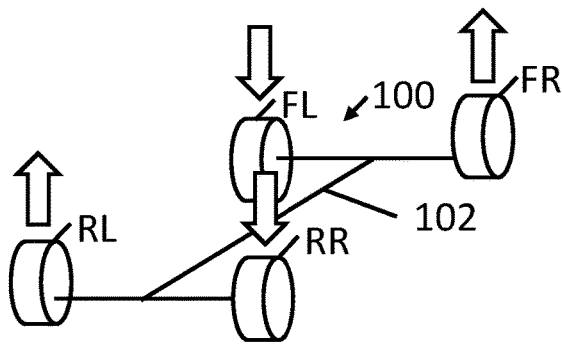
FIGS. 6A, 6B, 6C illustrate an example of the active suspension system creating clearance beneath pairs of diagonally-opposite wheels.
Figure 6B:
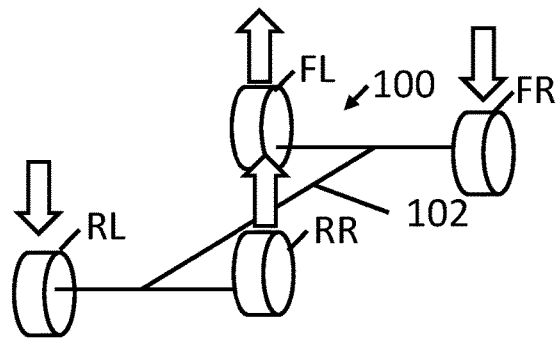
Figure 6C:
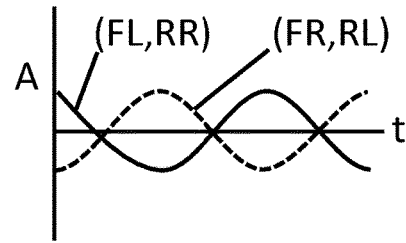

FIGS. 6A-6C illustrate a first example of recovery mode. FIGS. 6A, 6B are schematic illustrations of the vehicle wheels FL, FR, RL, RR and the vehicle body 102.

In this example, actuators 502 are controlled to lift up a first subset (pair) of wheels at first diagonally-opposite corners of the vehicle 100 to create clearance beneath the first subset of wheels, and concurrently push down a second subset (pair) of wheels at second diagonally-opposite corners of the vehicle 100. Therefore, one set of wheels is lifted/pulled (unweighted/unloaded) while the other set of wheels is pushed (weighted/loaded). One or both wheels of each subset is a driven wheel.

Creating clearance refers to reducing or removing a wheel-to-surface (tyre-to-surface) contact patch. This creates a clearance (space) into which surface particles can flow. The wheel may either retain a very small contact patch with the surface or may be lifted entirely off the surface, depending not only on the suspension capabilities but also how deeply the wheel is buried. Therefore, a request to substantially remove a contact patch can be interpreted as a force request that is high enough to lift a wheel entirely off a firm level surface as determined through calibration, but which may or may not be enough when the wheel is partially buried in a granular surface.

Lifting up a wheel refers to a force request to decrease wheel-to-body distance relative to an underlying/pre-existing target wheel-to-body distance. Pushing down a wheel refers to a force request to increase wheel-to-body distance relative to the underlying/pre-existing target. Lifting up a wheel may comprise retracting the actuator 502 of its associated suspension. Pushing down a wheel may comprise extending the actuator 502 of its associated suspension. It should be noted that whether retraction or extension is required depends on the type of mechanism linking the actuator 502 to the wheel. Lifting diagonal pairs of wheels encourages increased lift of one wheel if the vehicle has space to pitch slightly about the pair of wheels that are still pressed against the ground.

FIG. 6A illustrates a first state wherein the front right wheel FR and rear left wheel FL are lifted up (towards the vehicle body 102) as a diagonal pair while the front left wheel FL and rear right wheel RR are pushed down (away from the vehicle body 102) as a diagonal pair. The control system 300 may transmit a first force request comprising individual wheel force requests, to adopt the first state.

FIG. 6B illustrates a second state wherein the front right wheel FR and rear left wheel FL are pushed down as a diagonal pair while the front left wheel FL and rear right wheel RR are lifted up as a diagonal pair. The control system 300 may transmit a second force request comprising individual wheel force requests, to adopt the second state.

The pushed wheels reduce the force required to lift the first subset of wheels, by doing some of the work in lifting the vehicle 100. Pushing the non-lifted wheels further helps to prevent the vehicle body 102 from bellying out by maintaining a current average ground clearance. In another embodiment the non-lifted wheels are not pushed downwards and remain at their pre-existing target wheel-to-body distances. In a further embodiment the wheels FL and RR, which are pushed downward, could provide sufficient clearance beneath wheels FR and RL without even needing to lift the wheels FR and RL.

The force request may be configured to lift a wheel off flat firm ground, overcoming a corner weight through the wheel and overcoming restoring forces from passive components such as springs, bushes etc. The precise force request magnitude depends on the vehicle. The amount of corner weight removed from one diagonal pair of wheels can be added to the other diagonal pair of wheels, to maintain body composure.

Lifting/pushing wheels across diagonals helps to maintain vehicle body composure because any change in vehicle body attitude (angle) is neither pure roll nor pure pitch.

In one example the lifted and pushed wheels remain away from their underlying/pre-existing wheel-to-body distances until a transition/exit condition is satisfied, so that the driver/user has an opportunity to dig particulate matter under the lifted wheel (s). In some examples the driver could try various techniques for climbing out of the surface without getting out of the vehicle to dig (e.g. slowly spin wheels, steering wheel sawing). In such examples the lifting and pushing could either continue until a transition/exit condition is satisfied, or could continue for a set duration (e.g. not more than 1 minute).

The force request for lifting and pushing wheels could comprise a steady state displacement from a neutral/pre-existing target wheel-to-body distance. In addition or alternatively, the force request may vertically oscillate (pulse) wheels while they are spun slowly. Oscillation is illustrated in the amplitude (A)—time (t) graph of FIG. 6C wherein amplitude is wheel-to-body displacement amplitude (positive=further away from vehicle body 102). Oscillation of a spinning wheel could help to tamp down loose sand and/or feed in a recovery board under the vehicle. The recovery board would be placed at a near-tangent to the wheel as close to the bottom of the wheel as possible, and the spinning vertically-oscillating wheel could drag the recovery board further under the wheel. The slowness of the wheel rotation prevents sand/mud or other debris from being thrown up into the air. The wheel rotation can be triggered automatically without driver actuation of an accelerator, or manually.

If oscillation is employed, FIGS. 6A and 6B could represent the same oscillating pattern of FIG. 6C at different points in time, wherein the subsets of wheels are pulsed 180 degrees out of phase at a common frequency. Therefore, at any given time when one set of wheels is lifted, the other set of wheels is pushed.

The oscillation between pushing/lifting wheels maintains consistent average ground pressure but moves the weight distribution around the vehicle 100. Therefore, the vehicle 100 is less likely to belly out or momentarily lose traction that could cause the vehicle 100 to move unintentionally.

In some, but not necessarily all examples an oscillating pattern would be approximately sinusoidal for smoothness, as illustrated. In other examples the waveform is different or is a sequence of discontinuous pulses. The frequency may comprise a first predetermined frequency between approximately 0.25 Hz and approximately 3 Hz, and/or a second frequency between approximately 8 Hz and approximately 15 Hz to help tamp down loose sand. In an example, both frequencies are superimposed. In some examples, frequency sweeping is performed.

FIGS. 7A-7E illustrate another pattern in which individual wheels are lifted in sequence or in an oscillating pattern. Each wheel may be lifted one at a time so that particulate material can be moved under the wheel before progressing to the next wheel. The next wheel may be displaced after the previous wheel has returned to its neutral/pre-existing target wheel-to-body distance.

Lifting an individual wheel may comprise lifting the wheel to create clearance while at least some of the other three wheels are pushed downward to increase the clearance beneath the lifted wheel. In some implementations at least some of the other three wheels are not pushed downward.

Figure 7A:
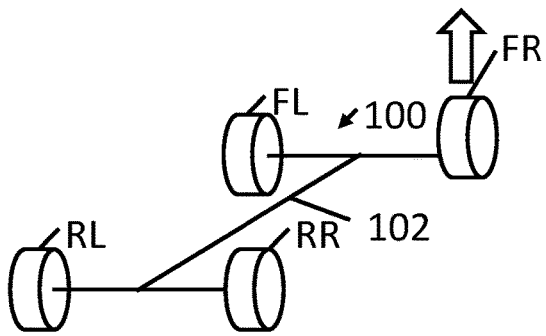
FIGS. 7A, 7B, 7C, 7D, 7E illustrate an example of the active suspension system creating clearance beneath individual wheels in sequence.
Figure 7B:
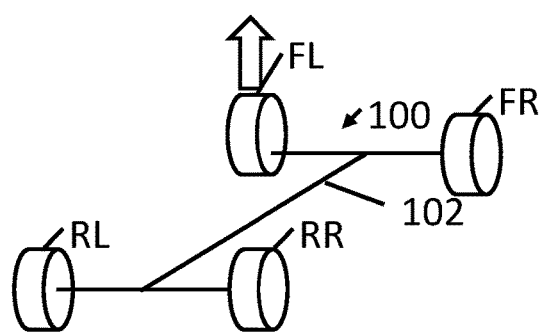
Figure 7C:
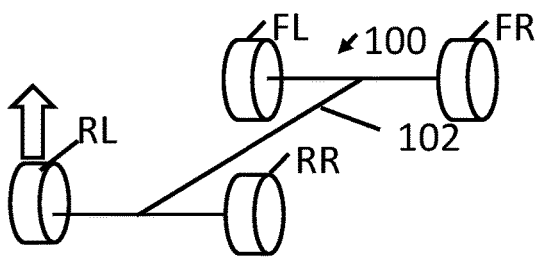
Figure 7D:
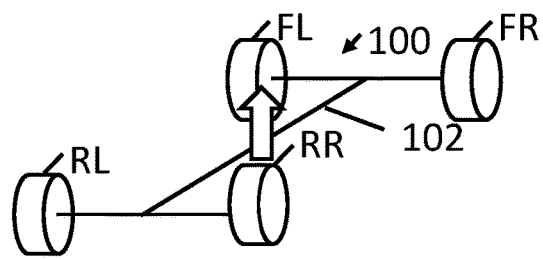
Figure 7E:
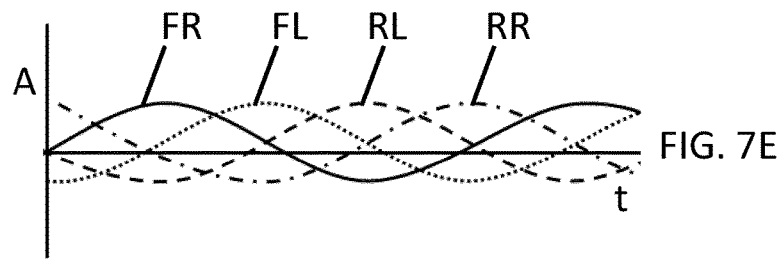

An oscillating pattern may comprise a rotating gimballing pattern, either clockwise or anticlockwise around the vehicle. FIGS. 7A-7E could represent the rotating pattern at four points in time, and FIG. 7E represents the amplitude-time curves.

A first wheel (e.g. FR) is pulsed at a first phase, wherein the first wheel is at a first lateral side (right) of the vehicle 100 and at a first longitudinal end (front) of the vehicle 100. FIG. 7A shows the first wheel FR in a lifted state (with ground clearance) while the other wheels are not in a lifted state.

A second wheel (e.g. FL) is pulsed at a second phase behind the first phase, wherein the second wheel is at a second lateral side (left) of the vehicle 100 and at the first longitudinal end (front). FIG. 7B shows the second wheel FL in a lifted state while the other wheels are not in a lifted state.

A third wheel (e.g. RL) is pulsed at a third phase behind the second phase, wherein the third wheel is at the second lateral side (left) and at a second longitudinal end (rear) of the vehicle 100. FIG. 7C shows the third wheel RL in a lifted state while the other wheels are not in a lifted state.

A fourth wheel (e.g. RR) is pulsed at a fourth phase behind the third phase, wherein the fourth wheel is at the first lateral side (right) and at the second longitudinal end (rear). FIG. 7D shows the fourth wheel RR in a lifted state while the other wheels are not in a lifted state.

As shown in FIG. 7E, the first to fourth phases may be approximately 90 degrees behind each other and their frequencies may be the same, to provide uniformly rotating contact patch force variation around the vehicle.

The gimballing motion around the vehicle helps to maintain vehicle body composure, so that vehicle body motion is neither pure roll nor pure pitch.

Figure 8:
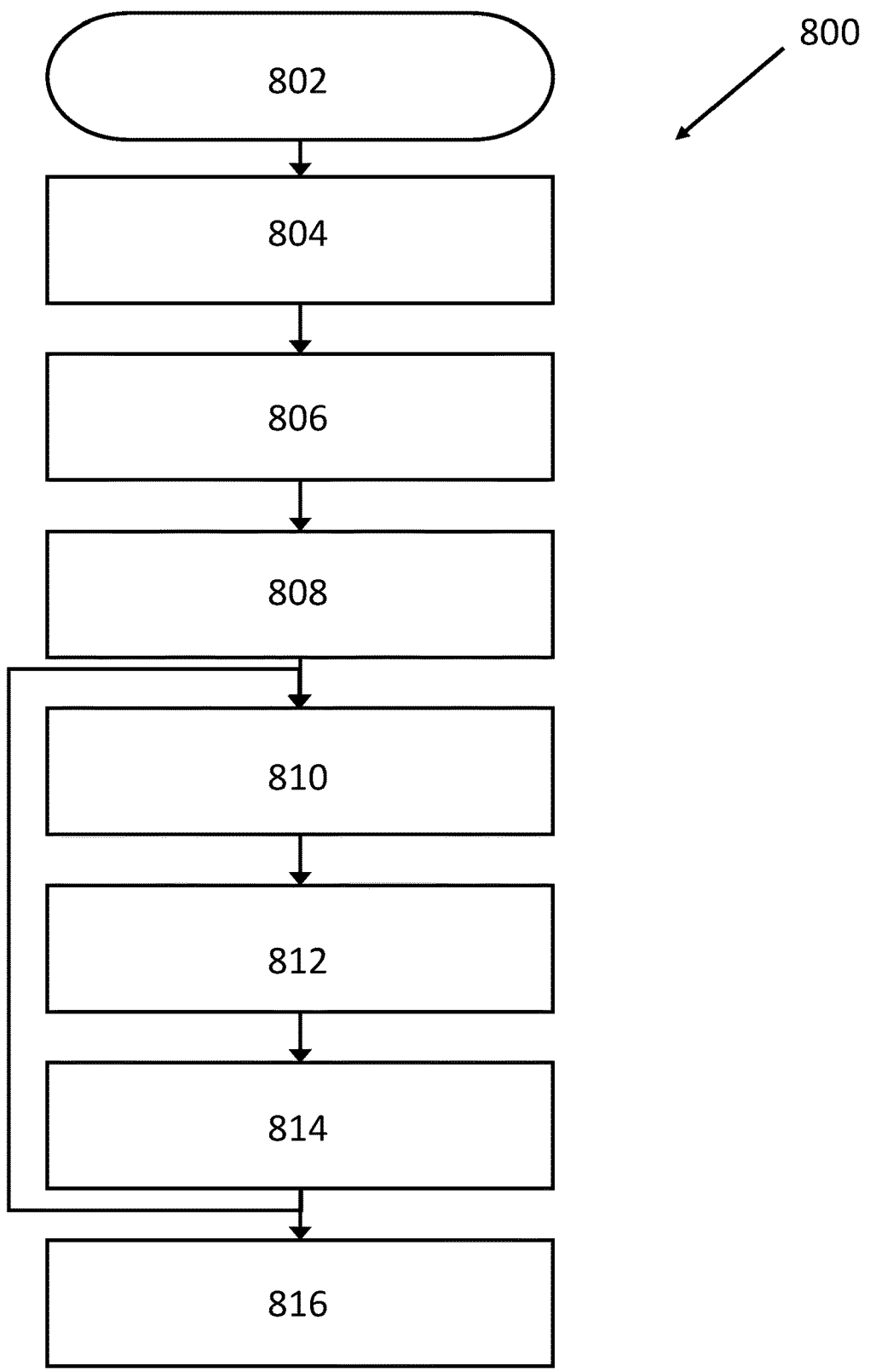
FIG. 8 illustrates an example method.

FIG. 8 is a flowchart illustrating an example control method 800 for recovery mode, implemented by the control system 300. In this example, but not necessarily all examples the recovery mode can be manually activated.

The method 800 starts at operation 802 in which recovery mode is enabled. Enabling the recovery mode may optionally require that one or more inhibit conditions are not satisfied.

An example inhibit condition is that the vehicle 100 is moving. The vehicle speed should be approximately zero for recovery to be needed. Vehicle speed measurement can enable the determination.

Another example inhibit condition is that the vehicle 100 is not secured against movement. The vehicle 100 can be secured against movement in one or more of the following ways: transmission selector in 'park' or 'neutral', vehicle 100 held by requested braking; parking brake (e-brake/handbrake) engaged. The states of these vehicle-securing systems can be checked by the control system 300.

Another example inhibit condition is that a torque request is greater than a threshold (e.g. is nonzero or some greater value). Torque should not be requested initially. If the vehicle 100 comprises a powertrain that is able to creep, the control system 300 could require that no creep torque is received by the wheels (e.g. torque source 103 is not engaged with the wheels). In some examples, the control system 300 could cause the torque source 103 to disengage and/or could transmit a brake request to hold the vehicle 100 stationary.

Another example inhibit condition is that at least one vehicle door is open as detected by a door open/closed sensor.

Another example inhibit condition is that one or more occupants (e.g. driver/passenger) is exiting the vehicle 100, as detected by a seat weight sensor, seatbelt sensor, cabin camera or other means.

At operation 804 an entry condition is satisfied. In a manual implementation, satisfaction of the entry condition comprises receiving a user-initiated (e.g. driver-initiated) request to activate the method 800. An HMI 520 may be provided to enable the request to be provided to the control system 300.

If an inhibit condition is satisfied the HMI 520 may be unavailable. In some embodiments, the user does not have to be inside the vehicle 100. For example, the HMI 520 could be rendered on the user's portable electronic device (e.g. smartphone/key fob/wearable device) to enable remote triggering of the method 800. The user could be standing next to affected wheels, for example.

If the entry condition is automatic, parameters such as wheel slip, vehicle speed and surface-detecting sensors (e.g. cameras) could help to indicate that the ability of the vehicle 100 to progress is impeded.

Upon satisfaction of the entry condition, the control system 300 may optionally determine which wheel or wheels need to be lifted and which wheel or wheels need to be pushed in order to create clearance beneath a target wheel. This may not be required if the wheels are to be oscillated as described earlier.

In an example, the driver-initiated request may identify (select) the wheel or wheels that need clearance. Alternatively, the control system 300 may control wheel selection by automatically determining which wheel needs to be lifted, such as the wheel that has least wheel slip compared to other wheels.

In some examples, the control system 300 may control wheel selection by limiting which wheels the driver can select, for instance if sensor information (e.g. tilt from accelerometer(s) 516/522) indicate that lifting a particular wheel would result in excessive vehicle body attitude changes.

On a slope, lifting the left front wheel may create clearance beneath the rear right wheel due to vehicle pitching, so the control system 300 could determine based on sensor information (e.g. tilt) the appropriate wheels to be lifted upwards and pushed downwards in order to create clearance beneath a target wheel. The control system 300 may be arranged to determine the gradient and direction of any slope on which the vehicle is standing and to take advantage of this gradient in choosing which wheel to lift first, so as to get the maximum advantage for the least effort by the system.

At operation 806 the active suspension system 104 is controlled to create clearance beneath a first wheel (e.g. FIG. 7A) or a first diagonal set of wheels (FIG. 6A).

Optionally, the control system 300 may further reduce the spring rate of the spring 504 and/or the actuator 502 of the wheel targeted for increased clearance, so that the active spring provides less resisting force that needs to be overcome for creating clearance beneath a wheel.

Optionally, a wheel is vertically oscillated using one of the earlier-described oscillation examples (FIGS. 6A-7E). The oscillation can help the vehicle 100 to climb out of the surface while a torque request is applied either automatically or by the driver, by further increasing the flow of granular material under the wheels.

While the wheels are lifted/pushed, the control system 300 may enable a torque request to be transmitted (automatically or manually) to the torque source 103 in an attempt to recover the vehicle 100 from the surface. Optionally the control system 300 may continue to require that all doors are closed. The control system 300 may continue to require that occupant(s) are inside the vehicle 100, if operation from outside is not allowed.

In some examples, the overall ride height of the vehicle 100 may also be raised in dependence on satisfaction of the entry condition, for example if the vehicle is already bellied out.

Operation 808 comprises the control system 300 transmitting a torque request to the torque source 103 to rotate at least the lifted wheel(s) by a predetermined small rotation of less than one full rotation. This is to help feed a recovery board or the like under the wheel having increased clearance. This may be performed at the same time as wheel oscillation to aid feeding of the recovery board under the wheel.

In an example, the predetermined wheel rotation is triggered manually via an HMI 520, when a user has placed a recovery board into a starting position. A wheel rotation of less than one full rotation is generally enough to feed in a recovery board of less than 2.5 metres length.

In an alternative implementation, the user manually uses an accelerator pedal or other throttle control to perform the small rotation.

If the wheels are lifted individually in sequence rather than in an oscillating pattern, a transition condition of operation 810 may be checked. This governs the transition from increasing clearance beneath one wheel or set of wheels, to increasing clearance beneath another wheel or set of wheels.

In some examples, the transition condition is user-initiated via an HMI 520 once the user has finished preparing the first wheel(s) for recovery (e.g. by inserting recovery board) and is ready to prepare the second wheel(s) for recovery. The user-initiated request could either be a confirmation that the user is ready to proceed to the next predetermined wheel, or an explicit user identification of which wheel requires recovery next.

In an example use case, the user has to re-enter the cabin and close the doors before the transition can be implemented. This ensures that the currently-lifted wheel descends when it is no longer being worked on. When the transition condition is satisfied an initial alert may also be rendered via an HMI 520 to ensure the area around the vehicle 100 is clear of others.

If the transition condition is automatic, the transition may be triggered after the ground clearance of the first wheel(s) has been maintained for a predetermined time having a value not more than 1 minute, for example.

Operation 812 is similar to operation 806 except this time the active suspension system 104 is controlled to create clearance beneath a second wheel (e.g. FIG. 7B) or second diagonal set of wheels (FIG. 6B). Operation 812 occurs either after the transition condition, or as part of an ongoing oscillation pattern.

Operation 814 is similar to operation 808. A torque source 103 rotates at least the lifted wheel(s) by a predetermined rotation, to feed in a recovery board. If different driven wheel have different torque sources (e.g. hub-mounted electric machines or 'through-the-road' hybrid powertrain), the torque source 103 may be different to that of operation 808.

After operation 814, a control loop is provided to before operation 810 in case any further individual wheels need their clearances increased (e.g. FIG. 7C then FIG. 7D).

At operation 816 an exit condition is satisfied. The exit condition could be a manual user-initiated termination request. Like the transition condition, the user could confirm via an HMI 520 that they are ready to proceed, and the control system 300 determines that no further wheels need to be lifted.

If the exit condition is automatic, the exit may be triggered after the ground clearance of the last wheel(s) has been maintained for the predetermined time. Another example of an automatic exit condition is a detection of vehicle speed exceeding a threshold which implies that the vehicle 100 is no longer stuck.

When the exit condition is satisfied, the method 800 is terminated. Optionally, an alert may be rendered to the user prompting them to check for any obstructions when they move the vehicle 100.

In some examples the above method 800 can be interrupted by a brake request above a threshold, a signal from HMI or the like. Therefore, if the user wishes to interrupt recovery mode they can do so quickly and intuitively.

In some examples the method 800 can be interrupted in response to a change or rate of change or of vehicle body attitude (roll, pitch and/or yaw) exceeding a threshold.

In some examples the method 800 can be interrupted in response to opening of a vehicle door while the wheels are being oscillated, rotated or are transitioning between different lifted/pushed patterns.

In some examples the method 800 can be interrupted in dependence on detection of a person and/or activity/movement in proximity to a wheel of the vehicle 100. The detection can be enabled by processing of data from object detection sensors such as visual light cameras, radar, lidar or ultrasonic sensors.

Interrupting the method 800 may comprise returning the active suspension system 104 to its pre-existing/neutral target wheel-to-body positions, and/or rendering an alert signal (e.g. honk horn, flash lights).

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 8 may represent steps in a method and/or sections of code in the computer program 308. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For example, wheels could be lifted for inspection and maintenance purposes rather than for recovery of a vehicle from a particulate surface.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant reserves the right to claim protection in respect of any patentable feature or combination of features hereinbefore referred to and/or shown in the drawings whether or not particular emphasis has been placed thereon.

The invention claimed is:

1. A control system for controlling an active suspension system of a vehicle, the control system comprising one or more controller, wherein the control system is configured to:
   determine that an entry condition is satisfied;
   in dependence on satisfaction of the entry condition, transmit a request to the active suspension system to create clearance beneath a first wheel of the vehicle but not create clearance beneath a plurality of other wheels of the vehicle, wherein the first wheel is at a first lateral side of the vehicle and at a first longitudinal end of the vehicle, and the plurality of other wheels comprise at least a second wheel at a second lateral side of the vehicle and at the first longitudinal end of the vehicle, and a third wheel at the first lateral side of the vehicle and at a second longitudinal end of the vehicle; and
   transmit a second request to the active suspension system to create clearance beneath the second wheel but not create clearance beneath at least the first wheel and a fourth wheel, wherein the fourth wheel is at the second lateral side of the vehicle and at the second longitudinal end of the vehicle, diagonally opposite the first wheel.

2. The control system of claim 1, wherein the request is configured to control a suspension actuator of the first wheel to lift the first wheel, and optionally wherein the request is configured to control suspension actuators of the plurality of other wheels to increase clearance beneath the first wheel.

3. The control system of claim 1, wherein the request is configured to create clearance beneath the first wheel but not beneath the second wheel, the third wheel, and a fourth wheel of the vehicle, wherein the fourth wheel is at the second lateral side and at the second longitudinal end, diagonally opposite the first wheel.

4. The control system of claim 3, wherein the second request is configured to create clearance beneath wheels of a diagonal pair of wheels comprising the second wheel and the third wheel or wherein the second request is configured to create clearance beneath the second wheel but not create clearance beneath the first wheel, the third wheel and the fourth wheel, and wherein the control system is configured to:
   transmit a third request to the active suspension system to create clearance beneath the third wheel but not create clearance beneath the first, second and fourth wheels; and
   transmit a fourth request to the active suspension system to create clearance beneath the fourth wheel but not create clearance beneath the first, second and third wheels.

5. The control system of claim 1, wherein the request comprises a force request configured to overcome restoring force associated with the first wheel, to substantially remove a contact patch beneath the first wheel.

6. The control system of claim 1, configured to control the active suspension system to cause a spring rate associated with the first wheel to have a reduced value when the active suspension system creates the clearance.

7. The control system of claim 1, wherein satisfaction of the entry condition comprises receiving a user-initiated request to create the clearance beneath the first wheel and optionally wherein the user-initiated request is configured to identify the first wheel as a user-selected wheel and/or wherein the control system is configured to control selection of the first wheel in response to the user-initiated request.

8. The control system of claim 1, wherein satisfaction of the entry condition requires determining that the vehicle is not moving.

9. A vehicle comprising the control system of claim 1.

10. The control system of claim 1, wherein satisfaction of the entry condition requires one or more of:
    determining that vehicle doors are closed;
    determining that one or more occupants are inside the vehicle; or
    determining that the vehicle is secured against movement.

11. The control system of claim 1, configured to maintain the request to maintain the clearance beneath the first wheel for not more than a set duration or until a second condition is satisfied.

12. The control system of claim 11, wherein the second condition is:

a transition condition configured to create clearance beneath a different wheel of the vehicle; or an exit condition dependent on at least a user-initiated termination request.

13. The control system of claim 12, wherein satisfaction of the transition condition is dependent on a user-initiated request.

14. The control system of claim 12, wherein satisfaction of the transition condition requires determining that the vehicle is not moving.

15. The control system of claim 1, configured to transmit a request to a torque source to rotate the first wheel by a rotation of less than one full rotation, while the request for clearance beneath the first wheel is maintained.

16. The control system of claim 15, configured to transmit a time-varying request to the active suspension system for causing oscillation of the first wheel while the first wheel is rotated.

17. A method of controlling an active suspension system of a vehicle, the method comprising:

determining that an entry condition is satisfied; and in dependence on satisfaction of the entry condition, transmitting a request to the active suspension system to create clearance beneath a first wheel of the vehicle but not create clearance beneath a plurality of other wheels of the vehicle, wherein the first wheel is at a first lateral-side of the vehicle and at a first longitudinal end of the vehicle, and the plurality of other wheels comprise at least a second wheel at a second lateral side of the vehicle and at the first longitudinal end of the vehicle, and a third wheel at the first lateral side of the vehicle and at a second longitudinal end of the vehicle; and transmitting a second request to the active suspension system to create clearance beneath the second wheel but not create clearance beneath at least the first wheel and a fourth wheel, wherein the fourth wheel is at the second lateral side of the vehicle and at the second longitudinal end of the vehicle, diagonally opposite the first wheel.

18. A non-transitory computer readable medium having stored thereon software that, when executed, is arranged to perform a method according to claim 12.

* * * * *